United States Patent Office 3,484,471
Patented Dec. 16, 1969

3,484,471
AMINOXYCYCLOPOLYSILOXANES
Robert A. Murphy, Burnt Hills, N.Y., assignor to General Electric Company, a corporation of New York
No Drawing. Filed Dec. 26, 1967, Ser. No. 693,165
Int. Cl. C07d 103/02, 29/18, 87/32
U.S. Cl. 260—448.8                           9 Claims

ABSTRACT OF THE DISCLOSURE

Compositions consisting essentially of certain aminoxycyclopolysiloxanes having chemically combined alkoxy radicals attached to silicon are provided, as well as methods for making them. The compositions can be employed as primers for treating the surface of masonry, and as curing agents for room temperature vulcanizing compositions.

---

The present invention relates to compositions consisting essentially of aminoxycyclopolysiloxanes having chemically combined alkoxy radicals attached to silicon, and a method for making them.

The compositions of the present invention consist essentially of aminoxycyclopolysiloxanes of the formula, (1)
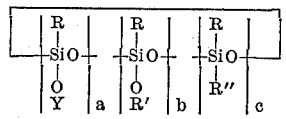

where R can be a monovalent hydrocarbon radical or halogenated monovalent hydrocarbon radical, Y is selected from an amine or heterocyclic amine radical, R' is selected from alkyl radicals and halogenated alkyl radicals having from 1 to 8 carbon atoms, R" is an alkyl radical or alkylaryl radical having from 2 to 20 carbon atoms, $a$ has an average value of from 1 to 7.5 inclusive, $b$ has an average value of from 0.5 to 7 inclusive, and the sum of $a+b$ has an average value of 3 to 8 inclusive, $c$ has an average value of 0 to 5 inclusive, and when $c$ is employed in combination with $a$ and $b$, $a+b$ has an average value of at least 3, and $a+b+c$ has an average value of 3 to 8 inclusive.

Radicals included by R of Formula 1 are, for example, aryl radicals, halogenated aryl radicals, such as phenyl, xylyl, chlorophenyl, tolyl, naphthyl, etc.; alkyl radicals, such as methyl, ethyl, propyl, trifluoropropyl, butyl, pentyl, hexyl, heptyl, octyl, etc.; alkenyl radicals such as vinyl, allyl, 1-propenyl, etc.; cycloalkyl radicals such as cyclohexyl, cycloheptyl, etc. Included by R' are all of the aforementioned alkyl radicals shown by R, having from 1 to 8 carbon atoms, and halogenated alkyl radicals such as β-chloroethyl, τ-chloropropyl,

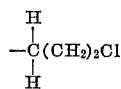

δ-chlorobutyl, etc. Radicals included by R" and all of the aforementioned alkyl radicals included by R and alkaryl radicals such as styryl, propylbenzene, etc. radicals. Radicals included by Y or Formula 1 are, for example, amine radicals, such as —NRZ, where Z is selected from hydrogen and R, and R is as previously defined. Y also includes heterocyclic amine radicals such as morpholino, piperidino, pyrolidino, etc. In the above formula where R, R' and R" and Y can be more than one radical, these radicals can be all the same, or any two or more of the aforementioned radicals, respectively.

Some of the aminoxycyclopolysiloxanes included by Formula 1 have the average formula, (2)
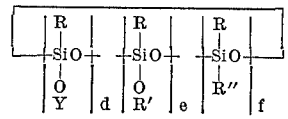

where R, R', R" and Y are as previously defined, $d$ has an average value equal to 1.5 to 3.5 inclusive, $e$ has an average value equal to 0.5 to 6.5 inclusive, the sum of $d+e$ has an average value equal to 3 to 8 inclusive, $f$ has an average value equal to 0 to 5 inclusive, and when $f$ is employed in combination with $d$ and $e$, $d$ and $e$ has an average value of at least 3, and $d+e+f$ has an average value equal to 3 to 8 inclusive. The aminoxycyclopolysiloxanes of Formula 2 and compositions consisting essentially thereof, are shown in my copending application 693,152, filed concurrently herewith and assigned to the same assignee as the present invention. These materials have been found to be valuable as curing agents for room temperature vulcanizing organopolysiloxane compositions.

Included by the aminoxycyclopolysiloxanes of Formula 1 are cyclics of the average formula,

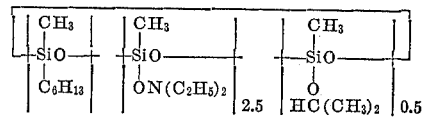

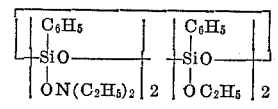

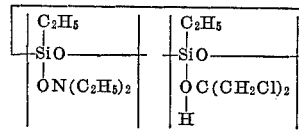

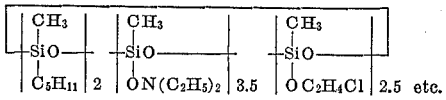

The compositions consisting essentially of the aminoxycyclopolysiloxanes of Formula 1, can be made by various methods which require the use of substantially anhydrous conditions, i.e., no more than 100 parts of water, per million parts of reaction mixture, and a temperature in the range of between about −25° C. to 150° C. For example, one method of making the compositions consisting essentially of the aminoxycyclopolysiloxanes of Formula 1, is by mixing from about 0.5 to about 7 moles of an aliphatic monohydric alcohol of the formula, (3)         R'OH per mole of a cyclopolysiloxane of the formula,

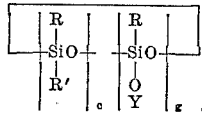

where R, R', Y and $c$ are as defined above, $g$ has a value equal to 3 to 8, inclusive, and the sum of $c+g$ has a value equal to 3 to 8 inclusive. The resulting mixture consists essentially of an aminoxycyclopolysiloxane of the Formula 1, and a hydroxylamine, YOH, as a displacement by-product of the reaction. Another method of making the compositions consisting essentially of the aminoxycyclopolysiloxanes of Formula 1, is by mixing a cyclopolysiloxane having chemically combined aminoxy radicals, alkoxy radicals, or a mixture thereof, with at least one other cyclopolysiloxane having one or more of the aforementioned radicals, to provide for the production of a mixture consisting essentially of an aminoxycyclopolysiloxane within the scope of Formula 1, and hydroxylamine as previously indicated. A further method of making the compositions consisting essentially of the aminoxycyclopolysiloxane of Formula 1, is by mixing a silicon hydride of the formula, (5)

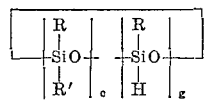

with an aliphatic monohydric alcohol of Formula 3 and a hydroxylamine, such as YOH. Generally, about a 10% molar excess of alcohol, and up to about 50% molar excess of hydroxylamine will provide for effective results, based on the requirements of the respective ingredients needed to make a composition consisting essentially of an aminoxycyclopolysiloxane within the scope of Formula 1. Since the alkoxy radical formed from the alcohol is generally more stable than the aminoxy radical formed from the hydroxylamine, the total moles of alcohol should be less than the total moles of ≡SiH utilized, while the sum of the total moles of alcohol and the hydroxylamine should be at least equal to or greater than the total moles of ≡SiH employed. An additional method of making the compositions consisting essentially of the aminoxycyclopolysiloxane of Formula 1, is by distilling aliphatic monohydric alcohol of Formula 3 from a mixture consisting essentially of YOH, and an alkoxycyclopolysiloxane of the formula, (6)

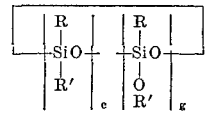

where the YOH has a higher boiling point than the aliphatic monohydric alcohol resulting from —OR' displacement.

The compositions consisting essentially of aminoxycyclopolysiloxanes of Formula 1 can be stripped of volatiles resulting from the reaction of the aliphatic monohydric alcohol of Formula 3 and cyclopolysiloxane of Formula 4, or the silicon hydride of Formula 5, hydroxylamine, and the aliphatic monohydric alcohol of Formula 3, or other methods described above. Stripping can be effected at a temperature up to 150° C. at atmospheric pressure, while temperatures up to 100° C. utilizing reduced pressures are preferred. The stripped product should be free of —OH, as shown by its infra-red spectrum indicating that all unreacted alcohol and YOH have been removed.

Compositions consisting essentially of the aminoxycyclopolysiloxanes of Formula 1, or stripped products made therefrom, can be employed as concrete primers to improve the adhesion of organopolysiloxane elastomers to concrete. The organopolysiloxane elastomers can be made from room temperature vulcanizing organopolysiloxane compositions. A further use of the aminoxycyclopolysiloxanes are as plasticizers for incorporating filler into organopolysiloxane gums.

Methods of making some of the cyclopolysiloxanes of Formula 4 are shown in my copending application Ser. No. 423,354, filed Jan. 4, 1965 and assigned to the same assignee as the present invention. For example, one method involves the reaction between a hydroxylamine, YOH, and a silicon hydride of Formula 5. Included by the aliphatic monohydric alcohols of Formula 3, are for example, methanol, ethanol, propanol, isopropanol, trifluoroethanol, butanol, pentanol, isoamyl alcohol, etc.

As previously indicated, the various aminoxycyclopolysiloxanes of the present invention are made under substantially anhydrous conditions. The proportions of aliphatic monohydric alcohol of Formula 3, silicon hydride and hydroxylamine utilized, or the ratio of the aminoxy radicals to the alkoxy radicals desired in the aminoxycyclopolysiloxane can vary widely. In instances where the aminoxycyclopolysiloxane is employed as a room temperature vulcanizing curing agent as shown, for example, by Formula 2, it is preferred to have the aminoxy and alkoxy functionality in the cyclic substantially equivalent, while not exceeding an average of about 3.5 aminoxy radicals per cyclic molecule. When utilized as a primer, it is preferred that the chemically combined aminoxy radicals exceed the number of chemically combined alkoxy radicals in the cyclopolysiloxane with the limits defined in Formula 1.

Among the preferred compositions, consisting essentially of the aminoxycyclopolysiloxanes of Formula 2, are compositions consisting essentially of aminoxycyclopolysiloxanes of the average formula, (7)

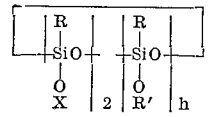

and aminoxycyc'opolysiloxanes of the formula, (8)

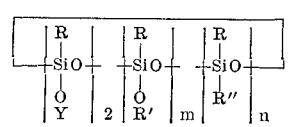

where $h$ can have an average value of from 2 to 6, inclusive, $m$ can have an average value of from 1 to 5, inclusive, $n$ can have an average value of from 1 to 5 inclusive, and the sum of $m+n$ can have an average value of from 2 to 6 inclusive.

In order that those skilled in the art will be better able to practice the invention, the following examples are given by way of illustration and not by way of limitation. All parts are by weight.

Example 1

Hexyl - tris - (diethylaminoxy)cyclotetrasiloxane of the formula,

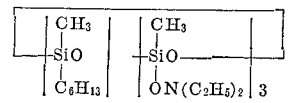

was prepared by the procedure shown in Example 7 of my copending application, Ser. No. 423,354, filed Jan. 4, 1965. In accordance with this procedure, one mole of 1,3,5,7-tetramethyl - 1-hexyl-3,5,7-trihydrocyclotetrasiloxane was added to 3.3 moles of N,N-diethylhydroxylamine over a 2 hour period at a temperature between 0° C. to 70° C. under a nitrogen atmosphere. The mixture was then distilled under reduced pressure to provide for the removal of excess N,N-diethylhydroxylamine. There was obtained the above aminoxy-substituted cyclopolysiloxane, $\eta_d^{25}$ 1.4314. Its identity was confirmed by its elemental analysis. The aminoxy-substituted cyclopolysiloxane was then mixed under substantially anhydrous conditions with an equal molar amount of isopropanol. The mixture was allowed to stand for 24 hours at 25° C. to achieve equilibrium. Based on method of preparation and its infrared spectrum, a composition was obtained consisting essentially of an aminoxyclotetrasiloxane having the average formula,

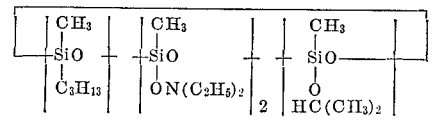

The identity of the composition was confirmed by its elemental analysis (wt. percent); theory; C, 46.4; H, 9.8; N, 6.5; Si, 17.4. Found: C, 44.95; H, 9.69; N, 6.30; Si, 18.82.

There was added to a mixture of 100 parts of silanol-terminated polydimethylsiloxane having a viscosity of about 90,000 centipoises at 25° C., 10 parts of a hydrogenated castor oil thickener, 2 parts of a fumed silica filler, and 5 parts of the above aminoxycyclotetrasiloxane. The mixture was prepared under substantially anhydrous conditions and placed in a sealed container to protect it from atmospheric moisture. After a shelf period of 7 days, a cured slab was molded by allowing a portion of the mixture to cure under atmospheric conditions. The surface of the curable mixture was tack free after 24 hours, and complete cure was achieved after 48 hours. The cured slab had a tensile (p.s.i.) of 90 and an elongation percent of 1200. A similar slab was made after a shelf period of 28 days. It had a tensile (p.s.i.) of 76 and elongation percent of 1100.

The same procedure was repeated, except there was utilized in place of the composition consisting essentially of the aminoxycyclotetrasiloxane curing agent, a product obtained by stripping the composition until it was free of —OH based on its infra-red spectrum. There was obtained an elastomer having a hardness. (Shore A) of 7, a tensile (p.s.i.) of 60 and elongation (percent) of 670.

Example 2

There was added under substantially anhydrous conditions, 182 parts of 1,3,5,7-tetrahydro-1,3,5,7-tetramethylcyclotetrasiloxane to a mixture of 225 parts of N,N-diethylhydroxylamine and 51 parts of dry isopropanol over a period of two hours, maintaining the reaction temperature between 25° C.–70° C. The mixture was allowed to stir under nitrogen sweep for 16 hours. An additional 11 parts of N,N-diethylhydroxylamine was added to the mixture to remove all traces of unreacted silicon hydride. The mixture was then stripped for two hours at 100° C. at 30 mm. Hg to remove excess hydroxylamine. There was obtained a 95% yield of product. Based on method of preparation, the product was,

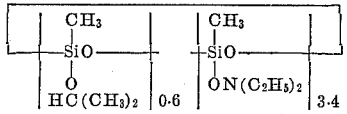

It had a refractive index of $\eta_d^{25}$ 1.4292. Its identity was confirmed by its elemental analysis (wt. percent); theory: percent C, 40.70; percent H, 8.85; percent N, 8.33; percent Si, 19.70. Found: percent C, 39 86; percent H, 8.68; percent N, 7.61; percent Si, 20.25.

Example 3

There was added, 182 parts of 1,3,5,7-tetrahydro-1,3,5,7-tetramethylcyclotetrasiloxane to a mixture of 152 parts of dry isopropanol, and 75 parts of N,N-diethylhydroxylamine over a six hour interval, maintaining the reaction temperature below 70° C. The reaction mixture was allowed to stir under a nitrogen sweep for 16 hours. An additional 48.4 parts of a 2:1 weight mixture of isopropanol:diethylhydroxylamine was added to complete the reaction. The mixture was then stripped of excess diethylhydroxylamine by heating it for two hours at 100° C. at 30 mm. Hg. An infrared spectrum of the product showed that it was free of —OH. There was obtained about a 95% yield of product of the formula,

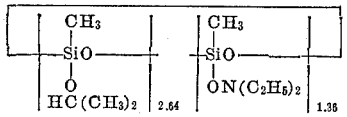

having a refractive index of $\eta_d^{25}$ 1.4130. Its identity was confirmed by its elemental analysis (wt. percent); Theory: percent C, 40.70; percent H, 8.67; percent N, 3.73; percent Si, 21.95. Found percent C, 39.77; percent H, 8.69; percent N, 3.11; percent Si, 22.61.

Example 4

A curing agent was prepared by mixing at ambient temperatures under substantially anhydrous conditions, 3 parts (0.00526 mole) of the aminoxycyclopolysiloxane of Example 2, and parts (0.01372 mole) of the aminoxycyclopolysiloxane of Example 3. Based on method of preparation, there was obtained an aminoxycyclopolysiloxane curing agent having the average formula,

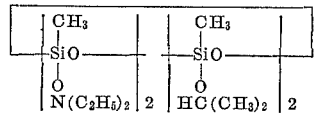

Five parts of the above curing agent was mixed under substantially anhydrous conditions with 100 parts of a mixture consisting of a silanol-terminated dimethylpolysiloxane having a viscosity of 93.000 centipoises at 25° C., and calcium carbonate, which contained about two parts of the dimethylpolysiloxane, per part of calcium carbonate. The resulting curable composition cured on exposure to air. There was obtained an elastomer having a hardness (Shore A) of 8, tensile (p.s.i.) of 173, and an elongation (percent) of 1100.

Example 5

In accordance with a procedure similar to that shown in Example 1, one mole of 1,3,5,7-tetrahydro-1,3,5,7-tetramethylcyclotetrasiloxane was added to 4.4 moles of N,N-diethylhydroxylamine over a 4 hour interval at a temperature between 0° C. to 70° C. under a nitrogen atmosphere. The mixture was then distilled under reduced pressure to provide for the removal of excess N,N-diethylhydroxylamine. There was obtained an aminoxycyclopolysiloxane of the formula,

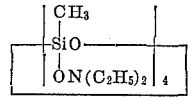

Its refractive index was $\eta_d^{25}$ 1.4342.

One mole of dry isopropanol is mixed under substantially anhydrous conditions with one mole of the above aminoxycyclopolysiloxane. The resulting mixture is allowed to stand for at least 24 hours at ambient temperature. Based on method of preparation, there is obtained a composition consisting essentially of an aminoxycyclopolysiloxane of the average formula,

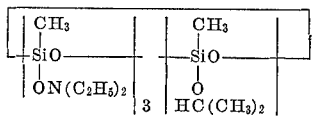

The above composition is painted on a concrete surface at ambient temperature and allowed to harden in moist air for 8–16 hours. It is found to be an effective primer for a siloxane non-skid coating composition as taught by Cash et al., Patent 3,350,330, assigned to the same assignee as the present invention.

Example 6

Butyl-tris-(N,N-diethylaminoxy)cyclotetrasiloxane of the formula,

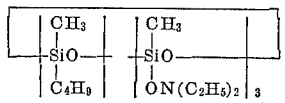

was prepared in accordance with the procedure described in Example 1, by effecting reaction between one mole of 1-butyl, 1,3,5,7-tetramethyl, 3,5,7-trihydrocyclotetrasiloxane, and 3.3 moles of N,N-diethylhydroxylamine. The resulting product was stripped to remove excess hydroxylamine.

One mole of the butyl-tris-(N,N-diethylaminoxy)-cyclotetrasiloxane described above, was mixed under substantially anhydrous conditions with 0.5 mole of isopropanol at room temperature and allowed to react for 48 hours. The resulting composition was then stripped of diethylhydroxylamine formed as a reaction by-product. There was obtained a 95% yield of an aminoxycyclopolysiloxane of the average formula,

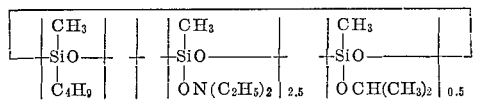

Its identity was confirmed by elemental analysis (wt. percent) .Theory: percent C, 40.5; percent H, 9.61; percent N, 6.74; percent Si, 21.7. Found: percent C, 4.19; percent H, 9.15; percent N, 5.90; percent Si, 22.82.

There were added five parts of the above aminoxycyclopolysiloxane, to 100 parts of the mixture of Example 1, consisting of the silanol-terminated polydimethylsiloxane, hydrogenated castor oil thickener and fumed silica filler. The resulting mixture cured in the presence of moist air to give an elastomer having a hardness (Shore A) of 13, tensile (p.s.i.) of 65, and an elongation (percent) of 380.

Example 7

One mole of the butyl-tris-(N,N-diethylaminoxy)-cyclotetrasiloxane of Example 6, was mixed under substantially anhydrous conditions with one mole of glyceroldichlorohydrin,

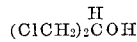

and allowed to react at room temperature for 48 hours. The mixture was then stripped of diethylhydroxylamine produced as a by-product. There was obtained a 95% yield of an aminoxycyclotetrasiloxane of the average formula,

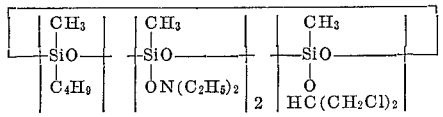

There was added to 100 parts of a mixture consisting of the silanol-terminated polydimethylsilane of Example 1, hydrogenated castor oil, filler, five parts of the above aminoxycyclotetrasiloxane. The resulting mixture cured in the presence of moist air to an elastomer having a hardness (Shore A) of 19, tensile (p.s.i.) of 78, and elongation (percent) of 270.

Example 9

In accordance with the procedure described in Example 2, one mole of 1-butyl,1,3,5,7,9-pentamethyl,1,3,5,7,9-tetrahydrocyclopentasiloxane is added under substantially anhydrous conditions to a mixture of 3.3 moles of N,N-diethylhydroxylamine and 1.1 moles of isopropanol utilizing a dry nitrogen atmosphere. The addition is performed over a 4 hour period at a temperature between 0° C. and 70° C. The mixture is then stripped of excess diethylhydroxylamine. Based on method of preparation, there is obtained an aminoxycyclopentasiloxane of the average formula,

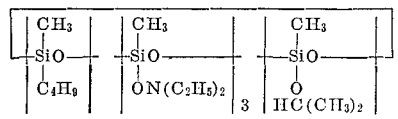

The above aminoxycyclopentasiloxane is applied to a concrete surface and allowed to cure under atmospheric conditions. It is found to improve the adhesion of non-skid siloxane compositions taught by Cash et al. patent described in Example 5.

While the foregoing examples have of necessity been limited to only a few of the very many variables within the scope of the present invention, it should be understood that the present invention is directed to a much broader class of compositions consisting essentially of the aminoxycyclopolysiloxanes of Formulas 1 and 2 and methods for making them. For example, aliphatic monohydric alcohol of Formula 3 can be mixed with aminoxycyclopolysiloxane of Formula 4, or a silicon hydride of Formula 5 can be mixed with hydroxylamine and the aforesaid aliphatic monohydric alcohol.

What I claim as new and desire to secure by Letters Patent of the United States is:

1. Compositions consisting essentially of aminoxycyclopolysiloxanes of the formula,

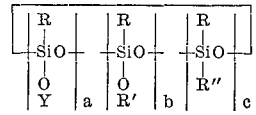

where R can be a monovalent hydrocarbon radical or halogenated monovalent hydrocarbon radical, Y is selected from morpholino, piperidino, pyrolidino, and —NRZ wherein Z is selected from hydrogen and R and R is as previously defined, R' is selected from alkyl radicals and halogenated alkyl radicals having from 1 to 8 carbon atoms, R'' is an alkyl radical or alkylaryl radical having from 2 to 20 carbon atoms, $a$ has an average value of from 1 to 7.5 inclusive, $b$ has an average value of from 0.5 to 7 inclusive, and the sum of $a+b$ has an average value of 3 to 8 inclusive, $c$ has an average value of 0 to 5 inclusive, and $a+b+c$ has an average value of 3 to 8, inclusive.

2. Aminoxycyclopolysiloxanes, which are obtained by stripping compositions of claim 1 to a temperature up to 150° C.

3. Compositions in accordance with claim 1, of the formula,

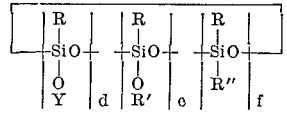

where R, R', R'' and Y are defined in claim 1, $d$ has an average value equal to 1.5 to 3.5 inclusive, $e$ has an average value equal to 0.5 to 6.5 inclusive, the sum of $d+e$ has an average value equal to 3 to 8 inclusive, $f$ has an average value equal to 0 to 5 inclusive, and $d+e+f$ has an average value equal to 3 to 8 inclusive.

4. A composition in accordance with claim 1, consisting essentially of an aminoxycyclopolysiloxane of the average formula,

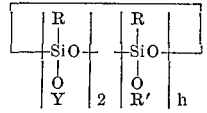

where R, R' and Y are as defined in claim 1, and $h$ has an average value of from 2 to 6 inclusive.

5. A composition in accordance with claim 1, consisting essentially of an aminoxycyclopolysiloxane of the formula,

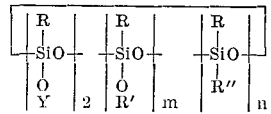

where R, R', R'' and Y are as defined in claim 1, $m$ has an average value of from 1 to 5 inclusive, $n$ has an average value of from 1 to 5 inclusive, and the sum of $m+n$ has an average value of from 2 to 6 inclusive.

6. A method for making a composition of claim 1, which comprises mixing under substantially anhydrous conditions at a temperature between −25° C. to 150° C. from about 0.5 to about 7 moles of an aliphatic monohydric alcohol of the formula,

R′OH per mole of a cyclopolysiloxane of the formula,

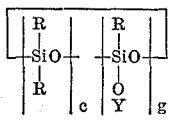

where R, R′, Y and $c$ are as defined in claim 1, and $g$ has a value equal to 3 to 8 inclusive and the sum of $c+g$ has a value equal to 3 to 8 inclusive.

7. A composition in accordance with claim 1, consisting essentially of an aminoxycyclotetrasiloxane of the formula,

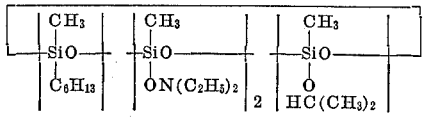

8. A composition in accordance with claim 1, consisting essentially of an aminoxycyclotetrasiloxane of the formula,

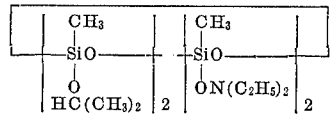

9. A composition in accordance with claim 1, consisting essentially of an aminoxycyclotetrasiloxane of the formula,

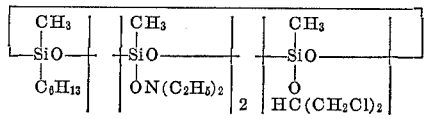

References Cited

UNITED STATES PATENTS

| | | | |
|---|---|---|---|
| 2,967,171 | 1/1961 | Barnes et al. | 260—448.8 XR |
| 3,318,898 | 5/1967 | Boissieras et al. | 260—448.2 XR |
| 3,296,199 | 1/1967 | Murphy | 260—448.2 XR |
| 3,359,237 | 12/1967 | Boissieras et al. | 260—448.2 XR |

DELBERT E. GANTZ, Primary Examiner.

P. F. SHAVER, Assistant Examiner

U.S. Cl. X.R.

260—46.5, 247, 247.7, 293, 294.7